(12) United States Patent
Ishida

(10) Patent No.: US 6,489,991 B2
(45) Date of Patent: Dec. 3, 2002

(54) TV CAMERA SYSTEM WITH EXTERNAL CABLE HAVING BUILT-IN AMPLIFIER FOR CONNECTING TV CAMERA UNIT TO LENS UNIT

(75) Inventor: Makoto Ishida, Koshigaya (JP)

(73) Assignee: Kowa Company Limited (JP)

( * ) Notice: Subject to any disclaimer, the term of this patent is extended or adjusted under 35 U.S.C. 154(b) by 0 days.

(21) Appl. No.: 09/767,501

(22) Filed: Jan. 23, 2001

(65) Prior Publication Data

US 2001/0009441 A1 Jul. 26, 2001

(30) Foreign Application Priority Data

Jan. 26, 2000 (JP) .......................................... 2000-016523

(51) Int. Cl.[7] ........................ G02B 13/16; H04N 5/225
(52) U.S. Cl. ........................ 348/335; 348/340; 348/360
(58) Field of Search .............................. 348/335, 340, 348/360, 373, 375; 396/529, 72, 85, 544; 359/739, 827

(56) References Cited

U.S. PATENT DOCUMENTS

| 4,399,466 A | * | 8/1983 | Stephenson ................. 348/373 |
| 4,862,208 A | * | 8/1989 | Yamada et al. ............. 396/529 |
| 5,087,978 A | * | 2/1992 | Hieda ......................... 348/360 |
| 5,343,263 A | * | 8/1994 | Takemae et al. ............. 354/82 |
| 5,877,811 A | * | 3/1999 | Iijima et al. ................ 348/373 |

FOREIGN PATENT DOCUMENTS

JP     2000101908 A    *   4/2000   ................... 5/238

* cited by examiner

Primary Examiner—Wendy R. Garber
Assistant Examiner—Jason Whipkey
(74) Attorney, Agent, or Firm—Adams & Wilks

(57) ABSTRACT

A TV camera system comprises a TV camera unit and a lens unit that can be attached to, and detached from, the TV camera unit. The lens unit includes an iris mechanism the operation of which is controlled by signals from the TV camera unit. The TV camera unit and lens unit are electrically connected by a cable that also includes an amplifier section that amplifies the signals sent from the TV camera unit to control the operation of the iris.

3 Claims, 2 Drawing Sheets

TV CAMERA SYSTEM WITH EXTERNAL CABLE HAVING BUILT-IN AMPLIFIER FOR CONNECTING TV CAMERA UNIT TO LENS UNIT

BACKGROUND OF THE INVENTION

1. Field of the Invention

The present invention relates to a TV camera system, and more particularly to a TV camera system having separable TV camera and lens units that are combined for use as a TV camera.

2. Description of the Prior Art

In prior art TV camera systems the lens unit that attaches to the TV camera unit is provided with an auto-iris mechanism, which requires an amplifier section to amplify iris drive signals transmitted from the TV camera section to thereby drive the iris mechanism. In this type of TV camera system the lens unit and the camera unit are separate units that are detachably mountable, enabling lenses and camera to be replaced by other lenses and cameras. TV camera units that incorporate an amplifier section and TV camera units that do not incorporate an amplifier section are both available in today's marketplace. This means that it is also necessary to have lens units that incorporate an amplifier section and lens units that do not incorporate an amplifier section, which increases the size of product lineups and decreases production efficiency.

Accordingly, an object of the present invention is to provide a TV camera system that enables the lens unit to be produced more efficiently.

SUMMARY OF THE INVENTION

In accordance with the present invention, the above object is attained by a TV camera system comprising a TV camera unit; a lens unit that is detachably mountable on the TV camera unit and includes an iris mechanism driven by signals from the TV camera unit; and a connecting cable having terminal portions for electrical connection at one end to the TV camera unit and at the other end to the lens unit, and an amplifier section for amplifying signals from the TV camera unit to drive the iris mechanism.

The above object is also attained by a TV camera system comprising a TV camera unit; a lens unit that is detachably mountable on the TV camera unit and includes an iris mechanism driven by signals from the TV camera unit; a first connecting cable having terminal portions for electrical connection at one end to the TV camera unit and at the other end to the lens unit; and a second connecting cable having terminal portions for electrical connection at one end to the TV camera unit and at the other end to the lens unit, and an amplifier section for amplifying signals from the TV camera unit to drive the iris mechanism, wherein said first connecting cable is used to connect the TV camera unit and lens unit when the TV camera unit does incorporate an amplifier section, and said second connecting cable is used to connect the TV camera unit and lens unit when the TV camera does not incorporate an amplifier section.

Each arrangement enables the amplifier section for amplifying the signals from the TV camera unit to drive the iris mechanism to be placed outside the lens unit. This eliminates the need to incorporate an amplifier section in the lens unit, thereby making it possible to produce lens units more efficiently.

Further features of the invention, its nature and various advantages will be more apparent from the accompanying drawings and following detailed description of the invention.

DESCRIPTION OF THE PREFERRED EMBODIMENT

Details of an embodiment of the present invention will now be explained with reference to the drawings.

Figure 1:
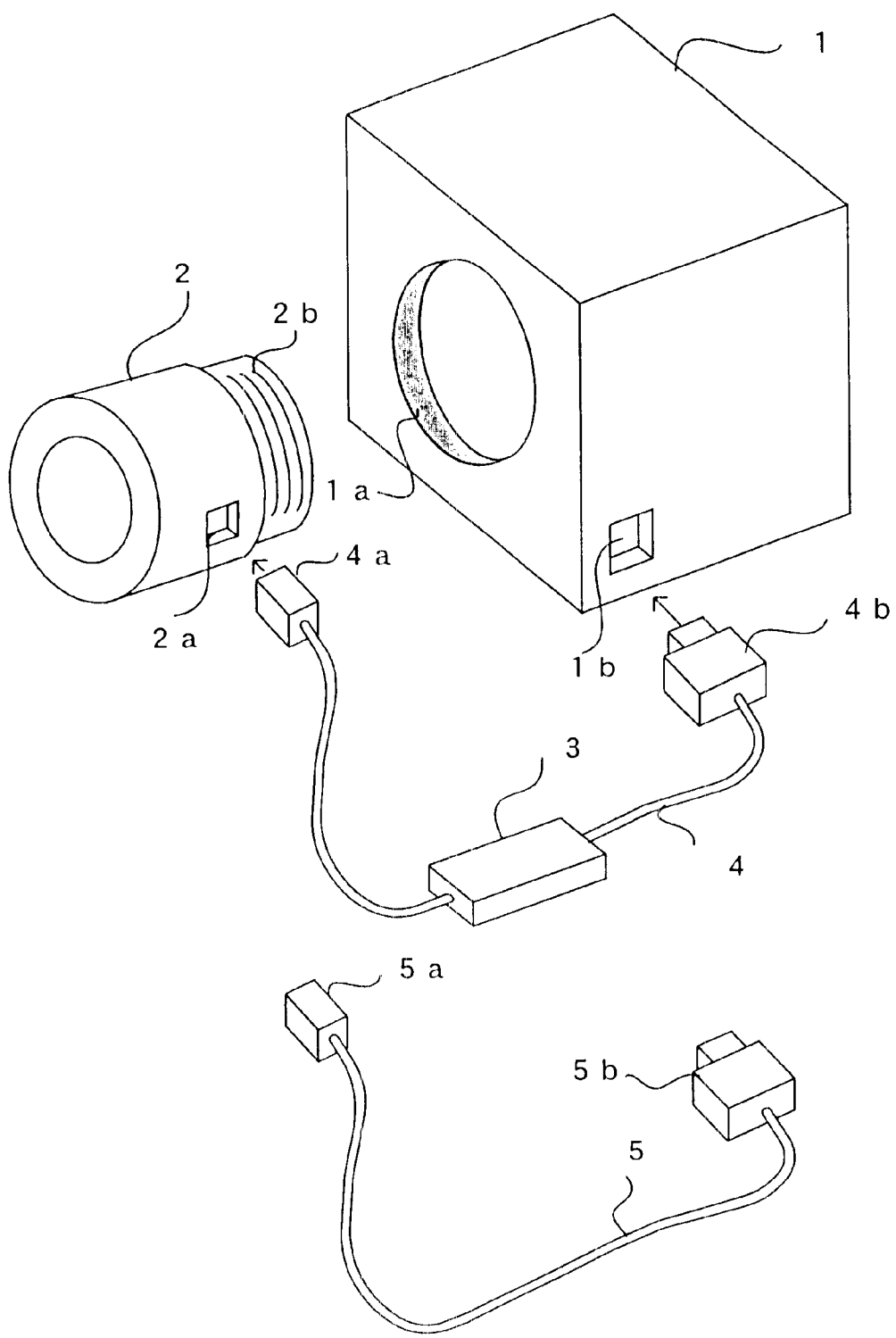
FIG. 1 is a perspective view showing the general arrangement of a TV camera system according to the present invention.

FIGS. 1 and 2 show a TV camera system according to an embodiment of this invention. In the drawings, reference numeral 1 denotes a TV camera unit and 2 a lens unit. The lens unit 2 can be detachably mounted on the TV camera unit 1 by screwed engagement of a threaded portion 2b of the lens unit 2 with a thread receiving portion 1a of the TV camera unit 1.

The lens unit 2 incorporates a mechanism 2c used to operate the iris of the lens. This mechanism 2c can be used to automatically adjust the iris to the optimum value in accordance with signals from the TV camera unit 1, thus realizing an auto-iris mechanism. Signals for driving the iris mechanism 2c are supplied to the iris mechanism 2c after being amplified by an amplifier section 3. The system is provided with two cables 4 and 5, which are used to electrically connect the TV camera unit 1 and the lens unit 2, respectively. Which cable is used depends on whether or not the TV camera unit 1 incorporates the amplifier section 3. One end of cable 4 has a plug-in connector 4a that plugs into a socket 2a on the lens unit 2, while the other end of the cable 4 has a plug-in connector 4b that plugs into a socket 1b on the TV camera unit 1. Positioned approximately in the middle of the cable 4 is the amplifier section 3 for amplifying signals used to drive the iris mechanism 2c. Connecting cable 5 does not have the amplifier section 3, but does have a plug-in connector 5a at one end that plugs into the socket 2a on the lens unit 2, and at the other end the cable 5 has a plug-in connector 5b that plugs into the socket 1b on the TV camera unit 1.

Figure 2A:
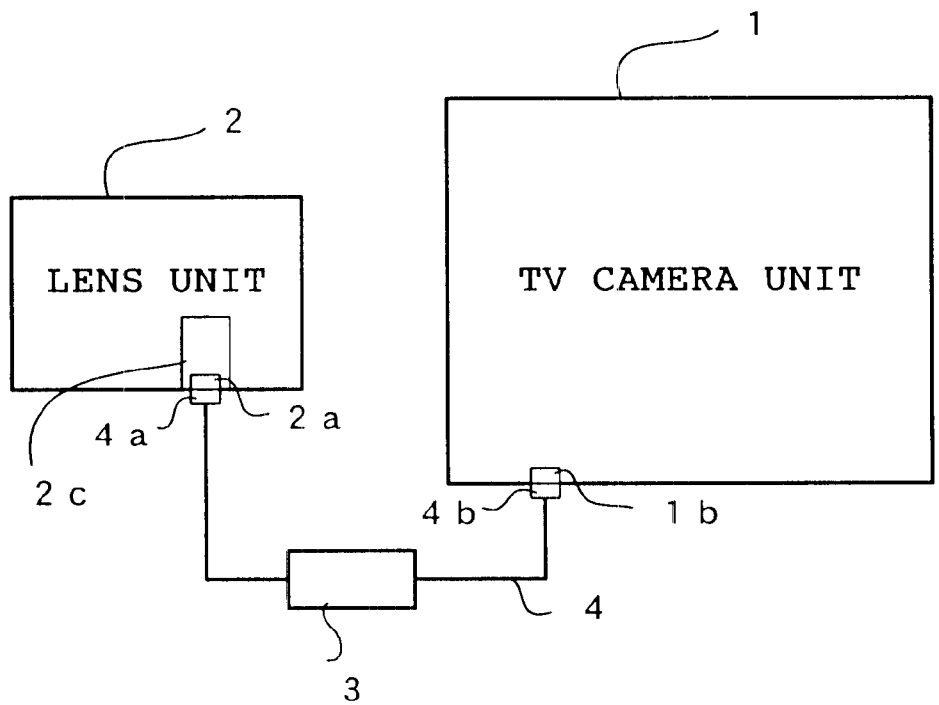
FIGS. 2a and 2b are a block diagram showing how to use a TV camera system according to the invention.
Figure 2B:
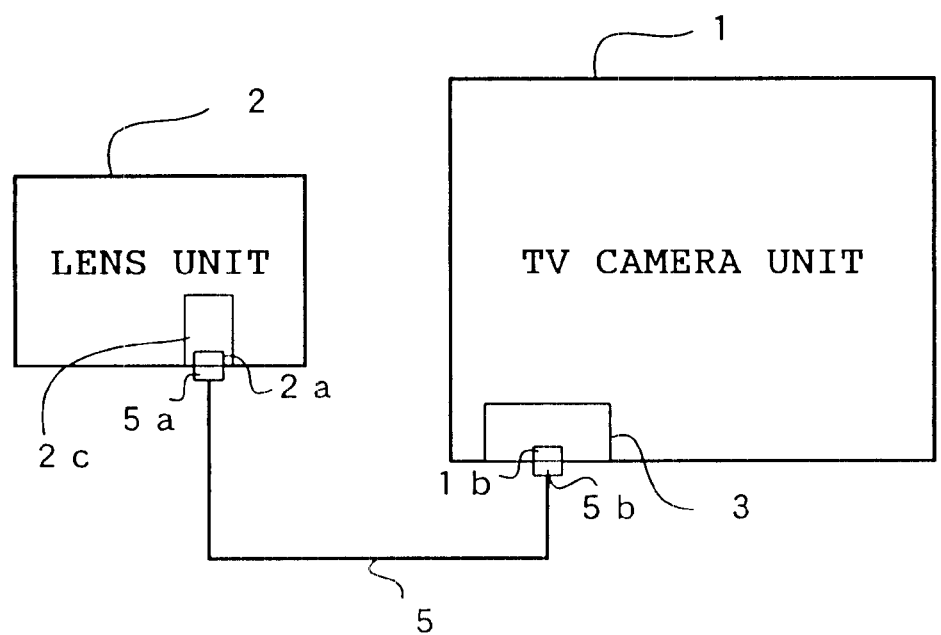

With the system thus arranged, when a TV camera unit 1 is used that does not incorporate an amplifier section 3, as shown in FIG. 2a, cable 4 is used by plugging the connector 4a at one end into the socket 2a on the lens unit 2, and plugging the connector 4b at the other end into the socket 1b on the TV camera unit 1. When a TV camera unit 1 is used that incorporates an amplifier section 3, as shown in FIG. 2b, cable 5 is used by plugging the connector 5a at one end into the socket 2a on the lens unit 2, and plugging the connector 5b at the other end into the socket 1b on the TV camera unit 1.

Thus, depending on whether or not the TV camera unit itself contains an amplifier section 3, either cable 4 with the amplifier section 3 or cable 5 having no amplifier section 3 is used to effect a connection between the TV camera unit 1 and the lens unit 2, ensuring the implementation of the auto-iris function without the incorporation of an amplifier section 3 in the lens unit. This enables the lens units to be manufactured more efficiently.

As described in the foregoing, in accordance with this invention, a connecting cable is provided that connects the TV camera unit to the lens unit, and has an amplifier section that amplifies the signals transmitted from the TV camera unit to operate the iris mechanism in the lens unit. Thus, the amplifier section can be located outside the lens unit. The fact that the amplifier section therefore does not have to be incorporated into the lens unit makes it possible to produce lens units more efficiently.

What is claimed is:

1. A TV camera system comprising:

a TV camera unit;

a lens unit that is detachably mountable on the TV camera unit and includes an iris mechanism driven by signals from the TV camera unit;

a first connecting cable having terminal portions for electrical connection at one end to the TV camera unit and at the other end to the lens unit; and a second connecting cable having terminal portions for electrical connection at one end to the TV camera unit and at the other end to the lens unit, and an amplifier section for amplifying signals from the TV camera unit to drive the iris mechanism;

said first connecting cable being used to connect the TV camera unit and lens unit when the TV camera unit does incorporate an amplifier section, and said second connecting cable being used to connect the TV camera unit and lens unit when the TV camera does not incorporate an amplifier section.

2. A TV camera system comprising: a TV camera unit for producing iris drive signals; a lens unit detachably mountable on the TV camera unit and having an iris mechanism capable of being driven by the iris drive signals; and a first external cable having terminals at opposite ends thereof for electrical connection at one end to the TV camera unit and at the other end to the lens unit for supplying the iris drive signals from the TV camera unit to the lens unit and having along the length thereof between the terminals an amplifier section for amplifying the iris drive signals.

3. A TV camera system according to claim 2; further including a second external cable having terminals at opposite ends thereof for electrical connection at one end to the TV camera unit and at the other end to the lens unit for supplying the iris drive signals from the TV camera unit to the lens unit, whereby the first external cable is used to connect the TV camera unit and lens unit when the TV camera unit does not have incorporated therein an amplifier section for amplifying the iris drive signals and the second external cable is used to connect the TV camera unit and lens unit when the TV camera unit does have incorporated therein an amplifier section for amplifying the iris drive signals.

* * * * *